US006353065B1

(12) United States Patent
Charleux et al.

(10) Patent No.: US 6,353,065 B1
(45) Date of Patent: Mar. 5, 2002

(54) EMULSION POLYMERIZATION IN THE PRESENCE OF A STABLE FREE RADICAL

(75) Inventors: Bernadette Charleux, Vincennes; Muriel Lansalot, Paris; Rosangela Pirri, Montardon; Jean-Pierre Vairon, Bourg la Reine; Sandrine Denie, Pau, all of (FR)

(73) Assignee: Elf Atochem S.A. (FR)

( * ) Notice: Subject to any disclaimer, the term of this patent is extended or adjusted under 35 U.S.C. 154(b) by 0 days.

(21) Appl. No.: 09/347,573

(22) Filed: Jul. 6, 1999

(30) Foreign Application Priority Data

Jul. 10, 1998 (FR) ............................................. 98 08916
Mar. 30, 1999 (FR) ............................................. 99 03941

(51) Int. Cl.$^7$ ........................... C08F 2/24; C08F 20/18; C08F 293/00; C08F 297/00; C08L 33/04
(52) U.S. Cl. ........................ 526/220; 524/458; 524/560; 524/561; 526/87; 526/193; 526/201; 526/328.5; 526/329.7
(58) Field of Search ............................... 526/220, 193, 526/204, 328.5, 87, 201, 329.7; 524/832, 833, 458, 560, 561

(56) References Cited

U.S. PATENT DOCUMENTS

| | | | |
|---|---|---|---|
| 5,256,397 A | | 10/1993 | Rosen |
| 5,322,912 A | * | 6/1994 | Georges et al. ............. 526/204 |
| 5,549,998 A | | 8/1996 | Georges et al. ............. 430/109 |
| 5,686,510 A | | 11/1997 | Fontenot et al. ............ 524/458 |
| 5,728,747 A | * | 3/1998 | Kazmaier et al. ............ 522/11 |
| 6,121,397 A | * | 9/2000 | MacLeod et al. ........... 526/204 |

FOREIGN PATENT DOCUMENTS

| | | | |
|---|---|---|---|
| BR | 9400671-7 | 10/1994 | |
| DE | 1972502 | 1/1999 | |
| DE | 1972505 | 11/1999 | |
| EP | 135280 | 5/1993 | |
| WO | 94/11412 | 5/1994 | |
| WO | WO 96/24620 | * 8/1996 | ............ C08F/4/00 |
| WO | 9900426 | 1/1999 | |
| WO | 9900427 | 1/1999 | |

OTHER PUBLICATIONS

Marestin et al. [Nitroxide Mediated Living Radical Polymerization of Styrene in Emulsion, Macromolecules, 31 (12), pp. 4041–4044 (1998)].*
Bouix et al. Synthesis of Amphiphilic Polyelectrolyte Block Copolymers Using "Living" Radical Polymerization–13 Application as stabilizers in emulsion polymerization, Macromol. Rapid Commun., 19, pp. 209–213 (1998).*
Bon et al. [Controlled Radical Polymerization in Emulsion, Macromolecules, 30 (2), pp. 324–326 (1997)].*
Grimaldi et al. [Synthesis and Application of "Living" Free Radical Polymerization of a New Class of Nitroxyl Radicals, Polymer Preprints, 38 (1), pp. 651–652 (1997)].*
Benoit et al. [Controlling Free–Radical polymerization in the Presence of a Novel Asymmetric Nitroxyl Radical), Polymer Preprints, 38 (1), pp. 729–730 (1997)].*
Suspension copolymerization of styrene and butadiene "Narrow MW Resins by a Free–Radical Polymerization Process", M.K. Georges, R.P.N. Veregin, P.M. Kazmaier, G.K. Hamer, Macromolecules 26, 2987 (1993).
Dispersion polymerization of styrene in water/ethylene glycol mixture "Living Free–Radical Dispersion Polymerization of Styrene", L.I. Gabaston, R.A. Jackson, S.P. Armes, Macromolecules 31, 2883 (1998).
Seeded emulsion polymerization of styrene "Controlled Radical Polymerization in Emulsion", S.A.F. Bon, M. Bosveld, B. Klumperman, A.L. German, Macromolecules 30, 324 (1997).
Miniemulsion polymerization of styrene, "Nitroxyde–Mediated Living Free–Radical Miniemulsion Polymerization of Styrene", T. Prodpran, V.L. Dimonie, E.D. Sudol, M.S. el–Aasser, PMSE, No. 80, 534 (1999).
Miniemulsion polymerization of styrene, "Stable Free–Radical Miniemulsion Polymerization", P.J. MacLeod, B. Keoshkerian, P. Odell, M.K. Georges PMSE, No. 80, 539 (1999).
Miniemulsion polymerization of styrene, "Miniemulsions Polymerizations: Applications and Continuous Process", Y.G. Durant, PMSE, No. 80, 538 (1999).
Batch emulsion polymerization of styrene (amino–TEMPO), "Controlled Radical Polymerization in Emulsion", C. Marestin, C. Noel, A. Guyot, J. Claverie, Macromolecules 31, 4041 (1998).
Synthesis of amphiphilic polyelectrolyte block copolymers using "living" radical polymerization. Applications as stabilizers in emulsion polymerization. M. Bouix, J. Gouzi, B. Charleux, J–P. Vairon, P. Guinot. Macromol. Rapid Commun., 19, 209–213 (1998).

* cited by examiner

Primary Examiner—David W. Wu
Assistant Examiner—Kelechi Egwim
(74) Attorney, Agent, or Firm—Millen, White, Zelano & Branigan, P.C.

(57) ABSTRACT

A process for the emulsion polymerization in the presence of a stable free radical of at least one monomer which can be polymerized by the radical route, which emulsion comprises a liquid aqueous phase and a liquid organic phase, the aqueous phase comprising at least 50% by weight of water and the liquid organic phase comprising more than 50% by weight of monomer(s) to be polymerized. The invention results, by a rapid controlled polymerization process, in a latex of polymer particles, it being possible for the polymer to comprise acrylate and/or methacrylate blocks.

23 Claims, No Drawings

EMULSION POLYMERIZATION IN THE PRESENCE OF A STABLE FREE RADICAL

FIELD OF THE INVENTION

The invention pertains to emulsion polymerization and the resultant products, and especially to monomers polymerizable by the free radical mechanism.

SUMMARY OF THE INVENTION

The invention relates in particular to a process for the emulsion polymerization in the presence of a stable free radical of at least one monomer which can be polymerized by the radical route, which emulsion comprises a liquid aqueous phase and a liquid organic phase, the said aqueous phase comprising at least 50% by weight of water and the said liquid organic phase comprising more than 50% by weight of monomer(s) to be polymerized. The invention results, by a rapid controlled polymerization process, in a latex of polymer particles. The polymer obtained exhibits a low polydispersity (ratio of the weight-average molecular mass to the number-average molecular mass, Mw/Mn). A polymerization process is controlled if the number-average molecular mass increases linearly as a function of the degree of conversion of monomer to polymer. The greater the deviation from linearity, the poorer the control. A controlled polymerization system is also a living polymerization system and makes possible, for this reason, the preparation of block copolymers. The invention makes possible in particular the preparation of sequential polymers comprising blocks of the acrylate and/or methacrylate type.

The emulsion comprises an aqueous phase and an organic phase. The aqueous phase comprises at least 50% by weight of water. The liquid organic phase comprises, at each instant in the polymerization, more than 50% by weight of monomer still to be polymerized.

The emulsion also comprises an emulsifying agent and, preferably, a radical polymerization initiator.

The aqueous phase is the continuous phase of the emulsion, so that it is the organic phase which is dispersed in the form of droplets.

The emulsion comprises a stable free radical.

A stable free radical must not be confused with free radicals with a transitory lifetime (a few milliseconds), such as the free radicals resulting from the usual polymerization initiators, such as peroxides, hydroperoxides and initiators of azo type. Polymerization initiator free radicals tend to accelerate the polymerization. In contrast, stable free radicals generally tend to slow down the polymerization. It will generally be said that a free radical is stable within the meaning of the present invention if it is not a polymerization initiator and if, under the conditions of use of the present invention, the mean lifetime of the radical is at least 5 minutes. During this period of life, the molecules of the stable free radical continuously alternate the radical state and the state of a group bonded to a polymer chain via a covalent bond. Of course, it is preferable for the stable free radical to exhibit good stability throughout the duration of its use in the context of the present invention. A stable free radical can generally be isolated in the radical state at room temperature. A stable free radical is sufficiently stable for its free radical state to be able to be characterized by spectroscopic methods.

The stable free radical forms, during the polymerization, a reversible bond with the growing polymer chain. The stable free radical continuously alternates, at the end of the polymer chain, the state of a group bonded to the said chain via a covalent bond and the state of a stable free radical detached from the said chain in order to allow the insertion of a monomer unit, according to the following process:

in which –M represents a monomer unit of the growing chain, M represents a monomer unit and Y• represents the stable free radical, for the case where the latter is monofunctional ($F_{SFR}=1$, $F_{SFR}$ representing the functionality of the stable free radical, that is to say the number of sites on the same stable free radical molecule exhibiting the radical state). This process is repeated in order for the polymer chain to grow by insertion of monomer between the growing chain and the stable free radical.

It will be recalled that the notion of stable free radical is known to a person skilled in the art to denote a radical which is so persistent and unreactive with respect to the air and moisture in the surrounding air that the pure radical can be handled and stored at room temperature without more in the way of precautions than are the majority of commercial chemicals (see, in this respect, D. Griller and K. Ingold, Accounts of Chemical Research, 1976, 9, 13–19 or Organic Chemistry of Stable Free Radicals, A. Forrester et al., Academic Press, 1968).

The family of the stable free radicals includes in particular the compounds acting as radical polymerization inhibitors for the storage of monomers, stable nitroxyl radicals, that is to say comprising the =N—O• group.

Use is to be made, as stable free radical, of, for example, the radicals represented by the following formulae:

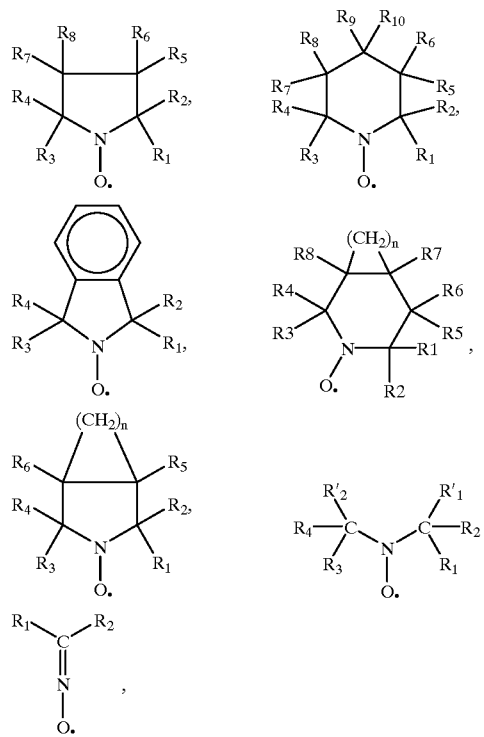

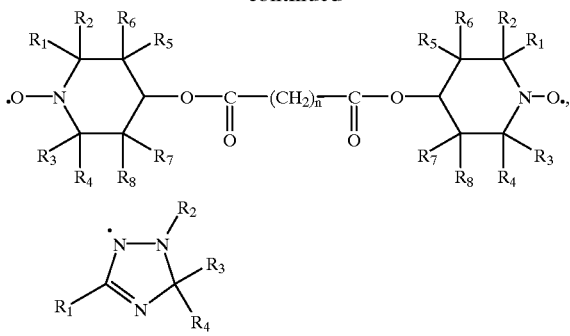

in which n represents a non-zero integer and $R_1$, $R_2$, $R_3$, $R_4$, $R'_1$ and $R'_2$, which can be identical or different, represent a hydrogen atom, a halogen atom, such as chlorine, bromine or iodine, a saturated or unsaturated, linear, branched or cyclic hydrocarbon-comprising group, such as an alkyl or phenyl radical, or a —COOR ester group or an —OR alkoxy group, or a —PO(OR)$_2$ phosphonate group, or a polymer chain which can, for example, be a poly(alkyl (meth)acrylate) chain, such as poly(methyl methacrylate), a polydiene chain, such as polybutadiene, or a polyolefin chain, such as polyethylene or polypropylene, but preferably being a polystyrene chain, and in which $R_5$, $R_6$, $R_7$, $R_8$, $R_9$ and $R_{10}$, which can be identical or different, can be chosen from the same family of groups as that which has just been envisaged for $R_1$, $R_2$, $R_3$, $R_4$, $R'_1$ and $R'_2$ and furthermore can represent an —OH hydroxide group or an acid group, such as —COOH or —PO(OH)$_2$ or —SO$_3$H.

In particular, the stable free radical can be 2,2,5,5-tetramethyl-1-pyrrolidinyloxy, sold under the trade name Proxyl, 2,2,6,6-tetramethyl-1-piperidinyloxy, generally sold under the name Tempo, 4-hydroxy-2,2,6,6-tetramethyl-1-piperidinyloxy, sold under the name 4-hydroxy-Tempo, or bis(1-oxyl-2,2,6,6-tetramethylpiperidin-4-yl) sebacate, sold under the trade name CXA 5415 by the company Ciba Specialty Chemicals.

The stable free radical can also be chosen from the following list:
  N-tert-butyl-1-phenyl-2-methylpropyl nitroxide,
  N-tert-butyl-1-(2-naphthyl)-2-methylpropyl nitroxide,
  N-tert-butyl-1-diethylphosphono-2,2-dimethylpropyl nitroxide,
  N-tert-butyl-1-dibenzylphosphono-2,2-dimethylpropyl nitroxide,
  N-phenyl-1-diethylphosphono-2,2-dimethylpropyl nitroxide,
  N-phenyl-1-diethylphosphono-1-methylethyl nitroxide,
  N-(1-phenyl-2-methylpropyl)-1-diethylphosphono-1-methylethyl nitroxide,
  4-oxo-2,2,6,6-tetramethyl-1-piperidinyloxy,
  2,4,6-tri(tert-butyl)phenoxy.

The stable free radical preferably comprises a linkage of formula:

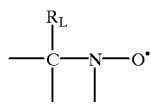
(1)

in which the $R_L$ radical exhibits a molar mass of greater than 15. The $R_L$ radical can, for example, be chosen from the list of the radicals envisaged previously for $R_1$, $R_2$, $R_3$, $R_4$, $R'_1$ and $R'_2$, as long as they exhibit a molar mass of greater than 15. The monovalent $R_L$ radical is said to be in the β-position with respect to the nitrogen atom of the nitroxide radical. The remaining valencies of the carbon atom and of the nitrogen atom in the formula (1) can be bonded to various radicals, such as a hydrogen atom or hydrocarbon-comprising radical, such as an alkyl, aryl or aralkyl radical, comprising from 1 to 10 carbon atoms. It is not excluded for the carbon atom and the nitrogen atom in the formula (1) to be connected to one another via a divalent radical, so as to form a ring. However, the remaining valencies of the carbon atom and of the nitrogen atom of the formula (1) are preferably bonded to monovalent radicals. The $R_L$ radical preferably exhibits a molar mass of greater than 30. The $R_L$ radical can, for example, have a molar mass of between 40 and 450. By way of example, the $R_L$ radical can be a radical comprising a phosphoryl group, it being possible for the said $R_L$ radical to be represented by the formula:

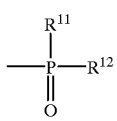
(2)

in which $R^{11}$ and $R^{12}$, which can be identical or different, can be chosen from alkyl, cycloalkyl, alkoxy, aryloxy, aryl, aralkyloxy, perfluoroalkyl or aralkyl radicals and can comprise from 1 to 20 carbon atoms. $R^{11}$ and/or $R^{12}$ can also be a halogen atom, such as a chlorine or bromine or fluorine or iodine atom. The $R_L$ radical can also comprise at least one aromatic ring, such as the phenyl radical or the naphthyl radical, it being possible for the latter to be substituted, for example by an alkyl radical comprising from 1 to 4 carbon atoms.

The stable free radical can be introduced so that (SFR)× $F_{(SFR)}$ ranges from $1 \times 10^{-1}$ to $1 \times 10^{-3}$ mol per mole of monomer, (SFR) representing the number of moles of stable free radical in the emulsion and F(SFR) representing the functionality of the stable free radical, that is to say the number of sites on the same stable free radical molecule exhibiting the radical state.

Mention may be made, as an example of a stable free radical for which the functionality $F_{SFR}$ is equal to 1, of a molecule represented by

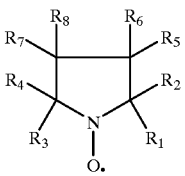

the $R_1$, $R_2$, $R_3$, $R_4$, $R_5$, $R_6$, $R_7$ and $R_8$ groups of which represent alkyl radicals.

Mention may be made, as an example of a stable free radical for which the functionality $F_{SFR}$ is equal to 2, of a molecule represented by:

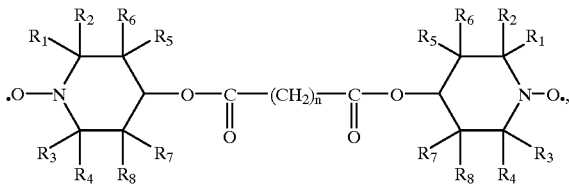

the $R_1$, $R_2$, $R_3$, $R_4$, $R_5$, $R_6$, $R_7$ and $R_8$ groups of which represent alkyl radicals and n of which represents a non-zero integer.

The stable free radical is preferably soluble in water at 25° C. in a proportion of at least 0.1 g/liter and more preferably 1 g/liter of water.

Any polymerization initiator can be used, such as organic peroxides and hydroperoxides, such as, for example, dibenzoyl peroxide or dicumyl peroxide or ethyl 3,3-di(tert-amylperoxy)butyrate. Mention may also be made, as initiator, of:

the following azo derivatives:
azobisisobutyronitrile,
4,4'-azobis(4-cyanopentanoic acid),
2,2'-azobis(2-amidinopropane)dihydrochloride,
persalts, in particular persulphates, such as potassium persulphate ($K_2S_2O_8$) or ammonium persulphate,
redox couples, such as $Fe^{2+}/H_2O_2$, $ROH/Ce^{4+}$ (R being in this instance an organic radical, such as an alkyl or aryl radical), $K_2S_2O_8/Fe^{2+}$ or $K_2S_2O_8/Na_2S_2O_5$.

The initiator is preferably water-soluble, that is to say that its solubility in the aqueous phase is at least 1 g/liter at 25° C. This condition with regard to the water-solubility of the initiator is more important when the emulsion is not a miniemulsion. A third substance can be added to the aqueous phase, so as to increase the solubility of the initiator in the said aqueous phase. For example, if the initiator is 4,4'-azobis(4-cyanopentanoic acid), the third substance can be sodium hydroxide or potassium hydroxide or ammonia. The third substance can be present in the aqueous phase in the proportion of 1 mol of third substance per mole of initiator.

The initiator can be introduced so that $(INI) \times F_{INI}$ ranges from $1 \times 10^{-4}$ to $1 \times 10^{-1}$ mol per mole of monomer, (INI) representing the number of moles of initiator and $F_{INI}$ representing the functionality of the initiator, that is to say the number of sites exhibiting the free radical state which each molecule of initiator is capable of generating.

Mention may be made, as an example of an initiator for which the functionality $F_{INI}$ is 2, of $K_2S_2O_8$.

Mention may be made, as an example of an initiator for which the functionality $F_{INI}$ is 4, of ethyl 3,3-di(tert-amylperoxy)butyrate, which can be represented by:

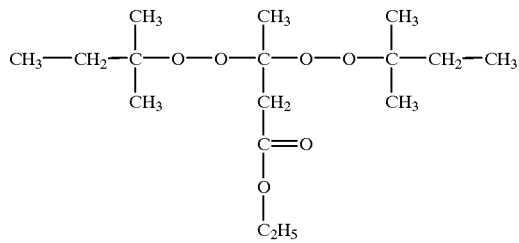

as it comprises two —O—O— linkages each capable of generating two sites exhibiting the free radical state, namely —O•.

The $[F_{SFR} \times (SFR)]/[F_{INI} \times (INI)]$ ratio preferably ranges from 0.1 to 5.

The stable free radical can be introduced into the polymerization medium in the form of a stable free radical or in the form of a molecule comprising a group capable of generating a stable free radical during the polymerization.

For example, for the case where a molecule comprising a group which might be represented by —A—Y is introduced into the polymerization medium, the said group being capable of generating a stable free radical Y• during the polymerization, it is necessary to take into account all the —A—Y groups introduced at the start in the context of the determination of the (SFR) amount mentioned above. Still in the context of this example, if, simultaneously with the formation of Y•, the —A• group is a polymerization initiator, it is also necessary to take into account all the —A—Y groups introduced at the start in the context of the determination of the (INI) amount mentioned above.

A compound exhibiting such an —A—Y group capable of generating a Y• stable free radical during the polymerization can be the emulsifying agent itself. Such an emulsifying agent carrying a group generating a stable free radical can be prepared by heat treatment of an emulsifying agent exhibiting a hydrocarbon-comprising chain, preferably comprising at least 5 carbon atoms, in the presence of a stable free radical and of a free radical initiator capable of pulling off a proton from the hydrocarbon-comprising chain. Such a heat treatment can be carried out, for example, from 70° C. to 150° C. and preferably from 80° C. to 125° C. on a medium comprising: $4 \times 10^{-2}$ to $1 \times 10^{-2}$ mol of emulsifying agent, $4 \times 10^{-3}$ to $1 \times 10^{-2}$ mol of initiator and $4 \times 10^{-2}$ to $1 \times 10^{-1}$ mol of solvent. The solvent can be, for example, water, an alcohol, such as ethanol, or any other polar solvent capable of dissolving the emulsifying agent.

Such an initiator can be an organic peroxide or hydroperoxide and can, for example, be chosen from the following list:

tert-butyl isopropyl monoperoxycarbonate,
tert-butyl 2-ethylhexyl monoperoxycarbonate,
dicumyl peroxide,
di-tert-butyl peroxide,
1,1-di(tert-butylperoxy)cyclohexane,
1,1-di(tort-butylperoxy)-3,3,5-trimethylcyclohexane,
tert-butyl peroxyacetate,
cumyl tert-butyl peroxide,
tert-butyl peroxybenzoate,
tert-butyl peroxy(2-ethylhexanoate).

The stable free radical is preferably introduced into the polymerization medium at least partially in the form bonded to the emulsifying agent, that is to say that the emulsifying agent is preferably, at least partially, carrying a group generating a stable free radical.

In this way, the stable free radical is particularly efficient, so that it is possible to introduce a smaller amount thereof in comparison with the same process in which the stable free radical would not be carried by the emulsifying agent.

The hydrocarbon-comprising chain belongs to the hydrophobic part of the emulsifying agent. This chain can be of the alkyl or polystyrene type or can be a fatty chain.

The emulsifying agent is a surfactant which makes it possible to stabilize the emulsion. Any standard emulsifying agent for this type of emulsion can be used.

The emulsifying agent can be anionic, cationic or nonionic. The emulsifying agent can be an amphoteric or quaternary or fluorinated surfactant. It can be chosen from alkyl or aryl sulphates, alkyl or aryl sulphonates, fatty acid salts, poly(vinyl alcohol)s or polyethoxylated fatty alcohols. By way of example, the emulsifying agent can be chosen from the following list:

sodium lauryl sulphate,
sodium dodecylbenzenesulphonate,
sodium stearate,
polyethoxylated nonylphenol,
sodium dihexyl sulphosuccinate,
sodium dioctyl sulphosuccinate,
lauryldimethylammonium bromide,
laurylamido betaken,
potassium perfluorooctylacetate.

The emulsifying agent can also be a block or random or grafted amphiphilic copolymer, such as sodium styrenesulphonate copolymers and in particular polystyrene-b-poly(sodium styrenesulphonate).

The emulsifying agent can be introduced into the polymerization medium in a proportion of 1 to 10% by mass with respect to the mass of monomer.

The emulsion can be a miniemulsion, that is to say an emulsion in which the organic phase forms droplets with a diameter of less than 2 µm, generally ranging from 100 to 1000 nanometers.

The miniemulsion state is obtained by virtue of sufficient shearing of the medium and by virtue of the presence in the miniemulsion of a hydrophobic polymer and of a cosolvent.

The hydrophobic polymer must be soluble in the organic phase, preferably exhibits a solubility in water at 25° C. of less than $1\times10^{-6}$ g/liter and exhibits a weight-average molecular mass at least equal to 100,000, for example ranging from 100,000 to 400,000. By way of example, the hydrophobic polymer can be polystyrene, poly(methyl methacrylate) or poly(butyl acrylate).

The hydrophobic polymer can be introduced into the emulsion in a proportion of 0.5 to 2% by weight with respect to the monomer to be polymerized.

The cosolvent exhibits a hydrocarbon-comprising linkage of at least six carbon atoms, exhibits a solubility in water at 25° C. of less than $1\times10^{-6}$ g/liter and is liquid at the polymerization temperature.

If the cosolvent does not comprise fluorine atoms, the hydrocarbon-comprising linkage preferably comprises at least 12 carbon atoms.

By way of example, the cosolvent can be:
hexadecane,
stearyl methacrylate,
dodecyl methacrylate,
perfluorooctyl methacrylate.

The shearing sufficient for producing the miniemulsion state can be carried out by vigorous agitation, for example obtained with ultrasound. Once the miniemulsion state has been obtained, it is generally possible to decrease the shearing, by bringing it to that usual for emulsions in general, while retaining the miniemulsion state.

The term "monomer" is understood to mean any monomer which can be polymerized or copolymerized by the radical route. The term "monomer" of course covers the mixtures of several monomers.

The monomer can be chosen from vinyl, vinylidene, diene and olefinic, or allylic monomers.

The term "vinyl monomers" is understood to mean (meth)acrylates, vinylaromatic monomers, vinyl esters, (meth)acrylonitrile, (meth)acrylamide and mono- and di(alkyl comprising 1 to 18 carbon atoms)(meth)acrylamides, and monoesters and diesters of maleic anhydride and of maleic acid.

The (meth)acrylates are in particular those of the formulae respectively

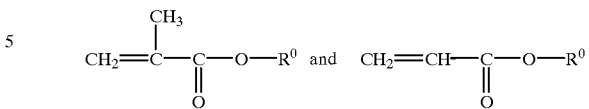

in which $R^0$ is chosen from linear or branched, primary, secondary or tertiary alkyl radicals comprising from 1 to 18 carbon atoms, cycloalkyl radicals comprising from 5 to 18 carbon atoms, alkoxyalkyl radicals in which the alkoxy part comprises 1 to 18 cxarbon atoms and the alkyl part comprises 1 to 18 carbon atoms, alkylthioalkyl radicals in which the alkylthio part comprises 1 to 18 carbon atoms and the alkyl part comprises 1 to 18 carbon atoms, aryl radicals and arylalkyl radicals, these radicals optionally being substituted by at least one halogen atom (such as fluorine) and/or at least one hydroxyl group, after protection of this hydroxyl group, the above alkyl groups being linear or branched; and glycidyl, norbornyl or isobornyl (meth)acrylates.

Mention may be made, as examples of useful methacrylates, of methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, isobornyl, hydroxypropyl or hydroxybutyl methacrylates.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl, ethoxyethyl, perfluorooctyl or behenyl acrylates.

The term "vinylaromatic monomer" is understood to mean, within the meaning of the present invention, an aromatic monomer possessing ethylenic unsaturation, such as styrene, vinyltoluene, α-methylstyrene, 4-methylstyrene, 3-methylstyrene, 4-methoxystyrene, 2-(hydroxymethyl) styrene, 4-ethylstyrene, 4-ethoxystyrene, 3,4-dimethylstyrene, 2-chlorostyrene, 3-chlorostyrene, 4-chloro-3-methylstyrene, 3-(tert-butyl)styrene, 2,4-dichlorostyrene, 2,6-dichlorostyrene and 1-vinylnaphthalene.

Mention may be made, as vinyl esters, of vinyl acetate, vinyl propionate, vinyl chloride and vinyl fluoride.

Mention is made, as vinylidene monomer, of vinylidene fluoride.

The term "diene monomer" is understood to mean a diene chosen from conjugated or non-conjugated, linear or cyclic dienes, such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, the 2-alkyl-2,9-norbornadienes, 5-ethylene-2-norbornene, 5-(2-propenyl)-2-norbornene, 5-(5-hexenyl)-2-norbornene, 1,5-cyclooctadiene, bicyclo[2,2,2]octa-2,5-diene, cyclopentadiene, 4,7,8,9-tetrahydroindene and isopropylidenetetrahydroindene.

Mention may be made, as olefinic monomers, of ethylene, butene, hexene and 1-octene. Fluorinated olefinic monomers may also be mentioned.

The process according to the invention makes possible the preparation of block polymers. This is because the polymerization of a first monomer by the process according to the invention leads to a living polymer block. It is then possible to connect a block of another polymer to this first block by placing the first living polymer block in a medium for the polymerization of a second monomer. It is thus possible to prepare block copolymers, for example copolymers comprising one or more polystyrene blocks and one or more polybutadiene blocks or copolymers comprising one or more polystyrene blocks and one or more blocks of the methacrylate type and one or more blocks of the acrylate type.

In practice, the blocks can be prepared following one another, in the same equipment. When the first monomer is consumed, so as to prepare the first block, it is sufficient to introduce the second monomer intended for the preparation of the second block, without stopping the stirring and without cooling or other interruption. Of course, the conditions for forming each of the blocks, such as the temperature of the emulsion, can be adjusted according to the nature of the monomers.

Of course, it is possible to join as many blocks to the living polymer as desired by placing the latter in a medium for the polymerization of a monomer from which it is desired to constitute a block.

Thus, the invention also relates to a process for the preparation of a block polymer comprising at least one stage according to the invention leading to a first living block, the said living block subsequently being placed in the presence of at least one other monomer from which it is desired to constitute a block joined to the first block, so as to form a living diblock, and so on, according to the number of blocks which it is desired to prepare.

Thus, the present application also relates to a process for the preparation of a diblock polymer, comprising a stage of polymerization of a first monomer in accordance with the invention, so as to obtain a first living block, followed by a stage during which the first living block is placed in the presence of a second monomer which is polymerized, so as to form a second block joined to the first block.

The present application therefore also relates to a process for the preparation of a triblock polymer comprising a stage of polymerization of a third monomer in the presence of the diblock polymer prepared in accordance with what has just been said, so as to form a third block joined to the diblock polymer.

By way of examples, the following block polymers can be prepared:

polystyrene-b-poly(methyl methacrylate),
polystyrene-b-polystyrenesulphonate,
polystyrene-b-polyacrylamide,
polystyrene-b-polymethacrylamide,
poly (methyl methacrylate)-b-poly(ethyl acrylate),
polystyrene-b-poly(butyl acrylate),
polybutadiene-b-poly(methyl methacrylate),
polyisoprene-b-poly(styrene-co-acrylonitrile),
polybutadiene-b-poly(styrene-co-acrylonitrile),
poly(styrene-co-butyl acrylate)-b-poly(methyl methacrylate),
polystyrene-b-poly(vinyl acetate),
polystyrene-b-poly(2-ethylhexyl acrylate),
polystyrene-b-poly(methyl methacrylate-co-hydroxyethyl acrylate),
polystyrene-b-polybutadiene-b-poly (methyl methacrylate),
polybutadiene-b-polystyrene-b-poly(methyl methacrylate),
polystyrene-b-poly(butyl acrylate)-b-polystyrene,
polystyrene-b-polybutadiene-b-polystyrene,
polystyrene-b-polyisoprene-b-polystyrene,
poly(perfluorooctyl acrylate)-b-poly(methyl methacrylate),
poly(perfluorooctyl acrylate-b-polystyrene,
poly(perfluorooctyl acrylate)-b-poly(behenyl acrylate),
poly(perfluorooctyl acrylate)-b-poly(stearyl methacrylate),
poly(n-octyl acrylate)-b-poly(methyl methacrylate).

For the case of the preparation of block copolymers and for the ease where an emulsifying agent carrying a group generating a stable free radical is used, it is possible to add initiator in an amount such that $F_{INI} \times (INI)$ ranges from 0 to $2.5 \times 10^{-2}$ mol per mole of new monomer (these values do not include the amounts of initiator used for the preparation of the preceding block or blocks) at the moment of the addition of a new monomer, so as to increase the polymerization rate. The term "new monomer" is understood to mean the monomer intended to form a new block (it is therefore not the first block) within the sequential polymer.

In the context of the present invention, the term "polymer" is to be taken in its general sense, so that it covers homopolymers, copolymers, terpolymers and polymer mixtures. The term "polymerization" is also to be taken in a general sense.

When it is intended to prepare a polymer comprising polymerized units of the acrylate or methacrylate type (that is to say "(meth)acrylate") and more particularly when it is intended to prepare a copolymer by beginning the polymerization with units of the acrylate type, it is particularly preferable to use a stable free radical comprising a linkage of formula

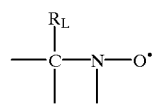

(1)

as described above.

Preferably, in order to improve the chemical stability of the emulsion and in particular to minimize the decomposition of the monomer in acidic medium, it is preferable to introduce, into the emulsion, a sufficient amount of a "pH buffer" compound which makes it possible to maintain the pH between 5 and 8.5 and preferably between 6 and 7. such a compound can, for example, be disodium phosphate ($Na_2HPO_4$) or sodium hydrogencarbonate ($NaHCO_3$) or $K_2CO_3$.

For the stable free radicals of nitroxide type which have a tendency to hydrolyse, according to the situation, at acidic pH or at basic pH, the pH buffer compound can also act to prevent this decomposition or to bring it about, if appropriate, in a controlled way.

The polymerization takes place more rapidly if the pH is at a rather low value, that is to say at a pH of less than 7, in comparison with a polymerization which takes place at a pH of greater than 7. Thus, it is possible to carry out the polymerization at a pH of less than 7, for example ranging from 2 to 4, if a high polymerization rate is desired, it being known that this effect is generally also reflected by poorer control of the polymerization.

The emulsion can be prepared by mixing, with stirring, an aqueous phase comprising:
water,
the initiator, the emulsifying agent, optionally carrying a group generating the stable free radical,
and an organic phase comprising:
  the monomer,
  the optional organic solvent,
  the stable free radical, if it is not carried by the emulsifying agent,
  the optional cosolvent.

The process according to the invention can be carried out, at least partially, at a temperature ranging from 50 to 140° C. and preferably from 85 to 130° C. The process according to the invention is carried out at a pressure sufficient to prevent the phases of the emulsion from boiling and sufficient for its various constituents to remain essentially in the emulsion (minimization of the passage into the vapour phase of the various constituents).

Thus, the process according to the invention can be carried-out partially, indeed even completely, at a temperature of less than 100° C. for example at a temperature of less than 95° C.

The polymerization process according to the invention results in a polymer latex. Within this latex, the combination of the polymer particles exhibits a mean diameter of less than 2 μm and generally of between 20 and 1000 nanometers.

The polymer particles can comprise polymerized units of at least two different monomers, at least one of which is an acrylate or methacrylate. Such a polymer can also comprise polymerized units of at least one vinylaromatic monomer and/or of at least one diene monomer.

The polymer particles can therefore comprise polymerized units of at least one acrylate and/or methacrylate and polymerized units of a monomer which is neither an acrylate nor a methacrylate. The polymer constituting these particles can be a block polymer and in particular one of those listed above.

The particles prepared by the process according to the invention comprise the stable free radical in the free form or in the form of a group generating a stable free radical.

The presence of the stable free radical or of the group generating the stable free radical can contribute to improving the thermostability of the polymer.

In the examples which follow, the following characterization techniques were used:
  conversion of monomer to polymer: by measuring the dry content relative to the mass of monomer charged,
  mean diameter of the particles: by light scattering (Malvern Zeta Sizer 4 device),
  molecular masses and polydispersity of the polymers: by steric exclusion chromatography after washing the polymer with water in order to remove the water-soluble species therefrom. A "Waters" chromatograph was used, tetrahydrofuran (THF) acting as eluent. The chromatograph was equipped with four FL gel® 10 μm (poly(styrene-divinylbenzene)) columns of 100, 500, 1000 and 10,000 Å and with double detection (refractometer and UV at 254 nm). Calibration was carried out with standard polystyrene samples. The polymers were injected at 10 mg/ml for a flow rate of 1 ml/min.

EXAMPLES 1 AND 2

199 g (i.e., 11.1 mol) of water and then 0.1245 g (i.e., 1.48×10⁻³ mol) of NaHCO₃ are introduced, with stirring, into a jacketed glass reactor equipped with a stirrer system and with a temperature control. When the NaHCO₃ has completely dissolved in the water, the solution obtained is degassed by sparging with nitrogen for 30 to 45 minutes, in order to remove the traces of oxygen. The temperature of the reactor being 90° C., 0.427 g (i.e., 2.07×10⁻³ mol) of sodium styrenesulphonate (NaSS), then 23 g (i.e., 0.22 mol) of styrene mixed with N-tert-butyl-1-diethylphosphono-2,2-dimethylpropyl nitroxide, the expanded form of which is

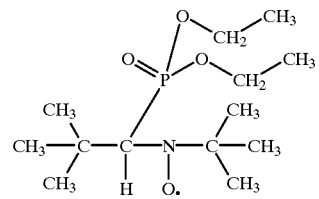

in an amount such that the $[(SFR) \times F_{SFR}]/[(INI) \times F_{INI}]$ ratio corresponds to the values shown in Table 1, then 0.182 g (i.e., 9.6×10⁻⁴ mol) of Na₂S₂O₅ dissolved in 5 g of water and then 0.254 g (i.e., 9.4×10⁻⁴ mol) of K₂S₂O₈ dissolved in 5 g of water are added, this last addition marking the time 0 of the polymerization. 5 ml samples are withdrawn throughout the reaction., in order to monitor the change in the molecular masses as a function of the conversion,
  to determine the reaction kinetics by gravimetry.

The results are collated in Table 1. In the case of Example 2, after the nucleation phase, it is observed that the number-average molecular mass increases in a substantially linear way as a function of the percentage of conversion.

TABLE 1

| Example No. | $\dfrac{SFR \times F_{SFR}}{INI \times F_{INI}}$ | Time (h) | Conversion (%) | Mn | Mw/Mn | Diameter of the particles (nm) |
|---|---|---|---|---|---|---|
| 1 | 0 | 2 | 99.3 | 48,357 | 2.97 | 108 |
| 2 | 0.6 | 5 | 21.1 | 1511 | 1.27 | 350 |
|   |   | 6 | 28.5 | 13,610 | 1.9 |   |
|   |   | 7 | 37.9 | 19,476 | 1.66 |   |
|   |   | 8 | 44.1 | 24,954 | 1.69 |   |
|   |   | 16 | 76.8 |   | 2.47 |   |

EXAMPLES 3 AND 4

The procedure is as for Examples 1 and 2, except that use is made of 0.156 g (i.e., 1.86×10⁻³ mol) of NaHCO₃ and except that the NaSS is replaced with 0.307 g (i.e., 1.07× 10⁻³ mol) of sodium lauryl sulphate (SDS).

The results are collated in Table 2.

In the case of Example 4, after the nucleation phase, it is observed that the number-average molecular mass increases in a substantially linear way as a function of the percentage of conversion up to a percentage of conversion of approximately 80%.

In the case of Example 4, it is observed that the pH changes from 6.7 at the beginning of polymerization to 4.6 when the conversion is approximately 80%.

TABLE 2

| Example No. | $\frac{(SFR) \times F_{SFR}}{(INI) \times F_{INI}}$ | Time (h) | Conversion (%) | Mn | Mw/Mn | Diameter of the particles (nm) |
|---|---|---|---|---|---|---|
| 3 | 0 | 1 h 30 min | 100 | 145,000 | 4 | 140 |
| 4 | 0.6 | 1 h 30 min | 11.8 | 3460 | 2.51 | 115.2 |
| | | 2 h | 23.2 | 6762 | 2.23 | |
| | | 2 h 30 min | 51.4 | 8500 | 2.88 | |
| | | 3 h | 76.4 | 13,086 | 2.76 | |
| | | 4 h 30 min | 96.8 | | 3.46 | |

EXAMPLES 5 AND 6

On the one hand, an organic solution is prepared by mixing:

23 g (i.e., 0.22 mol) of styrene,

N-tert-butyl-1-diethylphosphono-2,2-dimethylpropyl nitroxide in an amount such that the $(SFR) \times F_{SFR}/(INI) \times F_{INI}$ ratio in Table 3 is observed, i.e. 0 mol for Example 5 and $3.12 \times 10^{-4}$ mol for Example 6, 0.28 g of a polystyrene with a weight-average molecular mass of 300,000, 1.152 g (i.e., $1.08 \times 10^{-3}$ mol) of hexadecane.

On the other hand, an aqueous solution is prepared by mixing:

121.1 g of water, 0.792 g (i.e., $2.75 \times 10^{-3}$ mol) of sodium lauryl sulphate, 0.049 g (i.e., $2.6 \times 10^{-4}$ mol) of $Na_2S_2O_5$, 0.069 g (i.e., $26 \times 10^{-4}$ mol) of $K_2S_2O_8$.

These two solutions are subsequently mixed using magnetic stirring for 10 minutes. The mixture is subsequently subjected to strong turbulence with a very powerful ultrasound probe (400 watt ultrasound disintegrator, appearing on page 370 with the reference A65.900.10 of the 1996/1997 catalogue from OSI) for 10 minutes, so as to obtain an emulsion for which the size of the drops is of the order of 100 nm. The emulsion is subsequently degassed for 10 minutes by sparging with nitrogen, in order to remove the traces of oxygen.

The emulsion is subsequently placed in a 250 ml jacketed glass reactor preheated to 90° C. and stirred at 400 revolutions per minute. The time 0 corresponds to the moment at which the emulsion is introduced into the hot reactor. 5 ml samples are withdrawn throughout the reaction, in order to monitor the change in the molecular masses as a function of the conversion, to determine the reaction kinetics by gravimetry.

The results are collated in Table 3.

TABLE 3

| Example No. | $\frac{(SFR) \times F_{SFR}}{(INI) \times F_{INI}}$ | Time (h) | Conversion (%) | Mn | Mw/Mn | Diameter of the particles (nm) |
|---|---|---|---|---|---|---|
| 5 | 0 | 1 | 92 | 127,400 | 4 | 213 |
| 6 | 0.6 | 1 | 14 | 22,550 | 3.48 | 100 |
| | | 3 | 41.6 | 39,540 | 2.55 | |
| | | 5 | 55.6 | 56,700 | 2.29 | |

TABLE 3-continued

| Example No. | $\frac{(SFR) \times F_{SFR}}{(INI) \times F_{INI}}$ | Time (h) | Conversion (%) | Mn | Mw/Mn | Diameter of the particles (nm) |
|---|---|---|---|---|---|---|
| | | 7 | 71.8 | 71,000 | 2.82 | |
| | | 9 | 87.9 | 88,750 | 3.04 | |

EXAMPLE 7

A) Preparation of an Emulsifying Agent Carrying a Group Generating a Stable Free Radical a) Preparation of a poly(sodium styrenesulphonate) Block A mixture of 23.9 g of water and of 71.7 g of ethylene glycol is placed in a 250 ml jacketed glass reactor equipped with a stirrer and a temperature control, in which mixture are subsequently dissolved 28.72 g (i.e., 0.14 mol) of sodium styrenesulphonate monomer, then 0.1835 g of $Na_2HPO_4$, then 0.44 g (i.e., $1.57 \times 10^{-3}$ mol) of 4,4'-azobis(4-cyanopentanoic acid) (ACVA), then 0.8 g (i.e., $2.72 \times 10^{-3}$ mol) of N-tert-butyl-1-diethylphosphono-2,2-dimethylpropyl nitroxide and then 0.106 g of sodium hydroxide. The solution is subsequently degassed by sparging with nitrogen for 10 minutes, in order to remove the traces of oxygen.

The reaction is subsequently brought to 125° C. for 48 hours and then cooled. The polymer formed is precipitated twice from methanol and then filtered off and dried in an oven under vacuum at 50° C. for 24 hours.

b) Preparation of a Copolymer Comprising polystyrene-b-poly(sodium styrenesulphonate) Blocks A mixture of 7.5 g of water and 22.5 g of ethylene glycol, then 5 g of the polymer prepared in a), which dissolves, then 1 g (i.e., $9.6 \times 10^{-3}$ mol) of styrene and then 0.8 g (i.e., $2.72 \times 10^{-3}$ mol) of N-tert-butyl-1-diethylphosphono-2,2-dimethylpropyl nitroxide are placed in the same reactor as in a). The solution obtained is subsequently degassed by sparging with nitrogen for 10 minutes, in order to remove the traces of oxygen.

The reactor is subsequently brought to 125° C. for 24 hours and then cooled, and its contents are diluted with 20 g of demineralized water. The solution is subsequently, charged to a rotary evaporator under vacuum at room temperature, so as to remove the possible residual styrene monomer. The solution obtained is diafiltered for four days by passing over a membrane with a cutoff threshold of 1000 g/mol. The copolymer is finally isolated by complete evaporation of the solvents (water-ethylene glycol) on a rotary evaporator under vacuum at 50° C. and then drying in an oven under vacuum at 50° C. for 24 hours.

B) Preparation of a Copolymer Comprising polystyrene-b-poly(butyl acrylate) Blocks by Emulsion Polymerization 104.7 g of water, 0.26 g of the emulsifying agent prepared in A) (which carries one group generating a stable free radical per chain of emulsifying agent), then 0.0135 g (i.e., $9.5 \times 10^{-5}$ mol) of $Na_2HPO_4$ (pH buffer compound) and then 0.065 g (i.e., $6.25 \times 10^{-4}$ mol) of styrene are placed in the same reactor as above.

The solution obtained is degassed by sparging with nitrogen for 10 minutes, so as to remove the traces of oxygen.

The reactor is subsequently brought to 90° C. for 7 hours, which produces the polymerization of the styrene. 22.5 g (i.e., 0.176 mol) of butyl acrylate and 0.045 g (i.e., $2.36 \times 10^{-4}$ mol) of $K_2S_2O_8$ are added to the reactor, which is maintained at 90° C., and polymerization is allowed to take place at 90° C. for 18 hours.

Analysis by steric exclusion chromatography demonstrates that the butyl acrylate block is definitely bonded to the polystyrene block.

EXAMPLE 8

The procedure is as for Example 4, except that the NaHCO$_3$ is replaced by the same number of moles of K$_2$CO$_3$. A conversion of 8.4% is obtained on polymerizing for 7 hours. A latex was obtained for which the mean diameter of the particles is 375 nm. It is observed that the pH changes from 7.5 at the beginning of polymerization to 8.6 when the conversion reaches 8.4%. This example can be compared with Example 4. It is thus observed that maintaining the pH at a value greater than 7 was reflected by a lower polymerization rate.

EXAMPLE 9

A) Preparation of a Polystyrene Carrying a Group Generating a Stable Free Radical The following are placed in a 100 ml three-necked round-bottomed flask with magnetic stirring:

50 g (i.e., 0.48 mol) of styrene, 0.273 g (1.66×10$^{-3}$ mol) of azobisisobutyronitrile (AIBN), 0.694 g (i.e., 2.36×10$^{-3}$ mol) of N-tert-butyl-1-diethylphosphono-2,2-dimethylpropyl nitroxide.

Degassing with nitrogen is carried out for one hour at room temperature and then the mixture is heated at 90° C. for 4 h 30 min with stirring. The product obtained is precipitated from methanol and then filtered off and dried at 50° C. under vacuum. The polymer exhibits an M of 5200 and a polydispersity of 1.45.

B) Miniemulsion Polymerization in the Presence of the Carrier PS Prepared in A

On the one hand, an organic solution is prepared by mixing:

23 g (i.e., 0.22 mol) of styrene, 1.104 g (i.e., 4.88×10$^{-3}$ mol) of hexadecane, 1.3 g of the polystyrene carrying a group generating N-tert-butyl-1-diethylphosphono-2,2-dimethylpropyl nitroxide (and contributing in total 2.5×10$^{-4}$ mol of the stable free radical) prepared in Example A, 0.01 g (i.e., 3.4×10$^{-5}$ mol) of N-tert-butyl-1-diethylphosphono-2,2-dimethylpropyl nitroxide.

On the other hand, an aqueous solution is prepared by mixing:

207 g (i.e., 11.5 mol) of water, 0.936 g (i.e., 3.25×10$^{-3}$ mol) of sodium lauryl sulphate, 0.156 g (i.e., 1.86×10$^{-3}$ mol) of NaHCO$_3$.

These two solutions are subsequently mixed using magnetic stirring for 10 minutes. The mixture is subsequently subjected to strong turbulence by a very powerful ultrasound probe (400 watt ultrasound disintegrator, appearing in page 370 under the reference A65.900.10 of the 1996/1997 catalogue from OSI) for 10 minutes, so as to obtain an emulsion for which the size of the drops is of the order of 100 nm. The emulsion is subsequently degassed for 10 minutes by sparging with nitrogen, in order to remove the traces of oxygen.

The emulsion is subsequently placed in a 250 ml jacketed glass reactor preheated to 90° C. and stirred at 400 revolutions per minute. The time 0 corresponds to the time at which the emulsion is introduced into the hot reactor. 5 ml samples are withdrawn throughout the reaction, in order to monitor the change in the molecular masses as a function of the conversion, to determine the reaction kinetics by gravimetry.

The results are collated in Table 4.

It is observed that pH changes from 8.1 at the beginning of polymerization to 8.8 when the conversion is 4.8%.

TABLE 4

| Example No. | Time (h) | Conversion (%) | Mn | Mw/Mn | Diameter of the particles (nm) |
|---|---|---|---|---|---|
| 9 | 7 | 4.8 | 7020 | 1.48 | 137 |

EXAMPLE 10

A) Synthesis of N-tert-butyl-N-(1-diethylphosphono-2,2-dimethylpropyl)-O-(1-phenylethyl)hydroxylamine (1)

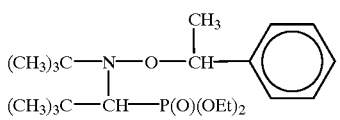

(1)

0.57 g of CuBr (4 mmol) and 1.25 g of 2,2'-bipyridine (8 mmol) are introduced into a 100 ml Schlenk tube purged with argon. 0.74 g of (1-bromoethyl)benzene (4 mmol) and 0.68 g of 86% DEPN (2 mmol), dissolved in 9 ml of anhydrous toluene, are added. Reaction is allowed to take place with stirring for 48 hours at room temperature. The reaction mixture is filtered through celite. The filtrate in washed with a 5% aqueous copper sulphate solution and then with water. The organic phase is dried over magnesium sulphate and then the solvent is evaporated. The product is purified by chromatography on a silica column using a 6/4 pentane/ether eluent. 0.75 g of the compound (1) is obtained (yield=95%) in the form of two diastereoisomers in 64/36 proportions determined on the $^{31}$P spectrum of the crude mixture by integration of the signals at 23.14 and 24.36 ppm (I/II=64/36).

B) Miniemulsion Polymerization in the Presence of the Alkoxyamine Prepared in A

Synthesis of a PBuA Block (poly(butyl acrylate))

On the one hand, an organic solution is prepared by mixing:

17.5 g (i.e., 0.134 mol) of butyl acrylate, 0.17 g of a polystyrene with a weight-average molar mass of 300,000 (as hydrophobic polymer), 0.7 g (i.e., 6.56×10$^{-4}$ mol) of hexadecane, 0.686 g (i.e., 1.72×10$^{-3}$ mol) of the alkoxyamine prepared in A.

On the other hand, an aqueous solution is prepared by mixing:

173.8 g (i.e., 9.66 mol of water), 0.566 g (i.e., 1.97×10$^{-3}$ mol) of sodium lauryl sulphate, 0.686 g (i.e., 1.29×10$^{-3}$ mol) of potassium perfluorooctylacetate.

These two solutions are subsequently mixed using magnetic stirring for 10 minutes. The mixture is subsequently subjected to strong turbulence by a very powerful ultrasound probe for 10 min, so as to obtain an emulsion for which the size of the drops is of the order of 100 nm. The emulsion is subsequently degassed for 10 min by sparging with nitrogen, in order to remove the traces of oxygen.

The emulsion is subsequently placed in a 250 ml jacketed stainless steel reactor, which can withstand a pressure at least equal to 5 bar, equipped with a stirrer system and with a temperature control. After starting the stirring at 400 r/min and after a cycle of degassing with nitrogen, an excess nitrogen pressure of 3 bar is introduced into the reactor in order to prevent the water boiling at 125° C. The set temperature of the reactor is placed at 120° C. and that of the jacket at 125° C. The time 0 corresponds to the moment when the reactor is at 125° C. After reacting for 5 hours at 125° C., the reaction mixture is cooled and a sample of latex obtained is withdrawn. The results are collated in the table below.

| Conversion (%) | Mn | Mw/Mn |
|---|---|---|
| 84.5 | 10,810 | 2.5 |

Synthesis of a Polystyrene Block Joined to the Preceding PBuA Block

- 121 g of the latex obtained above are kept in the reactor. Stirring is resumed at 400 r/min, then
- 5.3 g (i.e., $5.1 \times 10^{-2}$ mol) of styrene, and then
- 0.176 g (i.e., $6.13 \times 10^{-4}$ mol) of sodium lauryl sulphate are added.

The mixture is kept overnight at room temperature with stirring in order to allow the styrene to enter into the already formed latex particles.

After a cycle of degassing with nitrogen, an excess nitrogen pressure of 3 bar is introduced into the reactor. The set temperature of the reactor is then reset to 120° C. and that of the jacket to 125° C. After reacting for 6 hours at 125° C., the reaction mixture is cooled and a sample is withdrawn.

The results are collated in the table below:

| Conversion (%) | Mn | Mw/Mn |
|---|---|---|
| 83.4 overall | 19,630 | 1.8 |

The shift in the steric exclusion chromatographic peak demonstrates that the styrene block is definitely bonded to the poly(butyl acrylate) block.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/08916 and French application 99/03941, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process comprising conducting at a pH of less than 7 an emulsion polymerization of at least one monomer which can be polymerized by the radical route in the presence of a stable free radical comprising the linkage:

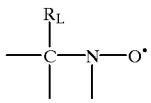

wherein the $R_L$ radical exhibits a molar mass of between 40 and 450 and is the formula:

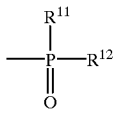

wherein $R^{11}$ and $R^{12}$, being identical or different, represent alkyl, cycloalkyl, alkoxy, aryloxy, aryl, aralkyloxy, perfluoroalkyl, aralkyl or halogen radicals;

and in the presence of an emulsifying agent, the emulsion comprising a continuous liquid aqueous phase comprising at least 50% by weight of water and a dispersed liquid organic phase wherein at each instance during the polymerization at least 50% by weight of the unpolymerized monomer(s) with respect to the total mass of unpolymerized monomer(s) is present in the liquid organic phase.

2. A process according to claim 1, wherein the stable free radical is N-tert-butyl-1-diethylphosphono-2,2-dimethylpropyl nitroxide.

3. A process according to claim 1, wherein the stable free radical is introduced in an amount such that $(SFR) \times F_{SFR}$ ranges from $1 \times 10^{-1}$ to $1 \times 10^{-3}$ mol per mole of monomer, (SFR) representing the number of moles of stable free radical and $F_{SFR}$ representing the functionality of the stable free radical.

4. A process according to claim 1, wherein the stable free radical is soluble in water at 25° C. in a proportion of at least 0.1 g/liter of water.

5. A process according to claim 4, wherein the stable free radical is soluble in water at 25° C. in a proportion of at least 1 g/liter of water.

6. A process according to claim 1, conducted in the further presence of a radical polymerization initiator which is soluble in the aqueous phase at 25° C. in a proportion of at least 1 g/liter.

7. A process according to claim 6, wherein said initiator is introduced so that $(INI) \times F_{INI}$ ranges from $1 \times 10^{-4}$ to $1 \times 10^{-1}$ mol per mole of monomer, (INI) representing the number of moles of initiator and $F_{INI}$ representing the functionality of the initiator.

8. A process according to claim 7, wherein $[F_{SFR} \times (SFR)]/[F_{INI} \times (INI)]$ ranges from 0.1 to 5.

9. A process according to claim 1, wherein the emulsifying agent is introduced in a proportion of 1 to 10% by mass with respect to the mass of monomer.

10. A process according to claim 1, wherein the stable free radical is introduced into the polymerization medium in the form of a stable free radical or of a molecule comprising a group capable of generating a stable free radical.

11. A process according to claim 10, wherein the stable free radical is introduced into the polymerization medium in a form bonded to the emulsifying agent, so that the emulsifying agent carries a group generating the stable free radical.

12. A process according to claim 1, wherein the emulsion is a miniemulsion.

13. A process according to claim 1, wherein different monomers are introduced successively into the polymerization medium, so as to form a block polymer.

14. A process according to claim 13, wherein an initiator is added at the moment of the addition of a new monomer.

15. A process according to claim 1, conducted at least partially, at a temperature ranging from 85 to 130° C.

16. A process according to claim 1, wherein the polymerization begins with monomers containing acrylate or methacrylate units.

17. A process according to claim 16, wherein the pH is between 6 and 7.

18. A process according to claim 1, conducted at least partially, at a temperature of less than 100° C.

19. A process according to claim 1, conducted at least partially, at a temperature of less than 95° C.

20. A process according to claim 19, conducted completely at a temperature of less than 95° C.

21. A process according to claim 1, wherein the stable free radical is introduced into the polymerization medium bonded to the emulsifying agent.

22. A process comprising conducting at a pH of less than 7 an emulsion polymerization of at least one monomer of an acrylate and/or methacrylate which can be polymerized by the radical route in the presence of a stable free radical comprising the linkage:

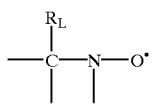

wherein the $R_L$ radical exhibits a molar mass of greater than 15;

and in the presence of an emulsifying agent, the emulsion comprising a continuous liquid aqueous phase comprising at least 50% by weight of water and a dispersed liquid organic phase wherein at each instance during the polymerization at least 50% by weight of the unpolymerized monomer(s) with respect to the total mass of unpolymerized monomer(s) is present in the liquid organic phase.

23. A process comprising conducting completely at a temperature of less than 100° C. and at a pH of less than 7 an emulsion polymerization of at least one monomer which can be polymerized by the radical route in the presence of a stable free radical comprising the linkage:

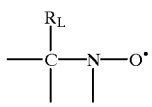

wherein the $R_L$ radical exhibits a molar mass of greater than 15;

and in the presence of an emulsifying agent, the emulsion comprising a continuous liquid aqueous phase comprising at least 50% by weight of water and a dispersed liquid organic phase wherein at each instance during the polymerization at least 50% by weight of the unpolymerized monomer(s) with respect to the total mass of unpolymerized monomer(s) is present in the liquid organic phase.

* * * * *